United States Patent
Bhat et al.

(10) Patent No.: US 12,020,278 B2
(45) Date of Patent: Jun. 25, 2024

(54) EMBEDDED STOREFRONT

(71) Applicant: Groupon, Inc., Chicago, IL (US)

(72) Inventors: Rajiv Bhat, Fremont, CA (US); Vijay Chittoor, San Francisco, CA (US); Ryoma Ito, Santa Clara, CA (US); Mehul Shah, Fremont, CA (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

(21) Appl. No.: 17/646,003

(22) Filed: Dec. 27, 2021

(65) Prior Publication Data

US 2022/0198507 A1  Jun. 23, 2022

Related U.S. Application Data

(63) Continuation of application No. 16/867,018, filed on May 5, 2020, now Pat. No. 11,244,343, which is a continuation of application No. 15/589,246, filed on May 8, 2017, now Pat. No. 10,685,371, which is a continuation of application No. 13/219,344, filed on Aug. 26, 2011, now Pat. No. 9,679,305.

(60) Provisional application No. 61/377,976, filed on Aug. 29, 2010.

(51) Int. Cl.
    *G06Q 30/00*   (2023.01)
    *G06Q 30/0241* (2023.01)
    *G06Q 30/06*   (2023.01)

(52) U.S. Cl.
    CPC ......... *G06Q 30/0241* (2013.01); *G06Q 30/06* (2013.01)

(58) Field of Classification Search
    None
    See application file for complete search history.

(56) References Cited

U.S. PATENT DOCUMENTS

| | | |
|---|---|---|
| 6,873,968 B2 | 3/2005 | Ehrlich et al. |
| 2004/0143495 A1 | 7/2004 | Koenig |
| 2005/0066018 A1* | 3/2005 | Whittle ............... G06F 9/542 |
| | | 718/100 |
| 2007/0174624 A1 | 7/2007 | Wolosewicz et al. |
| 2007/0255690 A1 | 11/2007 | Chang et al. |
| 2007/0265073 A1 | 11/2007 | Novi et al. |
| 2009/0006192 A1 | 1/2009 | Martinez et al. |

(Continued)

*Primary Examiner* — Mila Airapetian
(74) *Attorney, Agent, or Firm* — ALSTON & BIRD LLP

(57) ABSTRACT

A vertically integrated retail system includes an embedded storefront adapted to operate in a distributed manner through independent units embedded in different web sites or content in other host applications. Each unit of the embedded storefront enables a user to purchase goods, services, or other entities without leaving the host application. The units are modules that may be inserted into a web page, application, game, or other electronic media. Units can include product content such as video or animation, images, text, audio, music, or any other type of interactive or non-interactive electronic content. A user may receive virtual currency, virtual goods (such as virtual items or enhancements within a game application), or other rewards for completing transactions using the unit in the host application. Units may be embedded in host content via hyperlinks included in the content or through an application programming interface of a host content provider.

21 Claims, 15 Drawing Sheets

(56) References Cited

U.S. PATENT DOCUMENTS

| | | | |
|---|---|---|---|
| 2009/0006201 A1* | 1/2009 | Faseler, Jr. | G06Q 30/0277 715/777 |
| 2009/0038467 A1 | 2/2009 | Brennan | |
| 2010/0016080 A1 | 1/2010 | Garden et al. | |
| 2010/0042469 A1 | 2/2010 | Chandrasekar et al. | |
| 2010/0153831 A1 | 6/2010 | Beaton | |
| 2010/0198697 A1 | 8/2010 | Brown et al. | |
| 2010/0250336 A1* | 9/2010 | Selinger | G06Q 30/0643 705/26.7 |
| 2010/0262475 A1 | 10/2010 | Gavriline et al. | |
| 2011/0004517 A1 | 1/2011 | Soto et al. | |
| 2011/0078030 A1* | 3/2011 | Borst | G06Q 30/02 705/14.73 |
| 2011/0288666 A1 | 11/2011 | Cheng | |
| 2011/0289534 A1* | 11/2011 | Jordan | H04N 21/4668 725/48 |
| 2014/0236708 A1 | 8/2014 | Wolff et al. | |

* cited by examiner

FIG. 2

EMBEDDED STOREFRONT

CROSS-REFERENCE TO RELATED APPLICATIONS

The application is a continuation of U.S. application Ser. No. 16/867,018, titled "Embedded Storefront," filed May 5, 2020, which is a continuation of U.S. application Ser. No. 15/589,246, titled "Embedded Storefront," filed May 8, 2017 (now U.S. Pat. No. 10,685,371), which is a continuation of U.S. application Ser. No. 13/219,344, titled "Embedded Storefront," filed Aug. 26, 2011 (now U.S. Pat. No. 9,679,305), which claims priority to U.S. Provisional Patent App. No. 61/377,976, filed Aug. 29, 2010, and entitled "Embedded Storefront," which is incorporated by reference herein for all purposes.

BACKGROUND OF THE INVENTION

The invention relates to the field of online advertising and commerce systems. Online advertising systems promote products and services to users viewing web sites or applications. However, to learn more about a product or service in an advertisement, previous systems required the user to leave the web site or application to view a third-party web site. Because of this disruption of the user experience, many users hesitate to respond to online advertisements, even if the product or service is of interest to them.

Therefore, there is an unmet need for systems and methods of online advertising and commerce that allow users to view, investigate, and purchase products, services, and other entities without disrupting the user experience by leaving the web site or application.

BRIEF SUMMARY OF THE INVENTION

Embodiments of the invention include a vertically integrated retail system with an embedded storefront. The operator of this retail system is referred to as the 'retailer'. The embedded storefront system operates through a plurality of units embedded in different web sites or applications. Each unit of the embedded storefront is a transactional ad unit that enables a user viewing an internet website, playing a game, or using an application (all of which are referred to generally as a 'host application' provided by a 'publisher') to purchase goods, services, or other entities being offered through the embedded storefront, either by the retailer directly or by a third-party supplier without leaving the host application. In an embodiment, the transactional ad unit is a module that can be inserted into a web page, application, game, or other electronic media.

Embodiments of the transactional ad unit include video or animation, images, text, audio, music, or any other type of interactive or non-interactive electronic content to inform a user about one or more products, services, or other entities for sale. Embodiments of the transactional ad unit also include a user interface or integrate with the user interface of the host application to enable a user to purchase items presented for sale within the unit without leaving the host application. In some embodiments of the invention, a user may receive virtual currency, virtual goods (such as virtual items or enhancements within a game application), or other rewards for completing transactions using the transactional ad unit in the host application. The transactional ad unit can also be viewed as the unit of a distributed marketplace where transactions are concluded on hosted applications without users having to visit a centralized website.

The other components of the retail system include an impressions delivery system, an order management system, an inventory management system, and a warehouse/fulfillment center. The embedded storefront can be viewed as a distributed marketplace where transactions are concluded on hosted applications without users having to visit a centralized website. In an embodiment, the publisher hosts the embedded storefront by using Application Programming Interfaces (APIs) that call the retailer's servers. In another example, the retailer may produce one or more host applications.

BRIEF DESCRIPTION OF THE DRAWINGS

The invention will be described with reference to the drawings, in which:

FIG. 2 illustrates an example user interface for purchasing items using the transactional ad unit according to an embodiment of invention;

DETAILED DESCRIPTION

Figure 14:
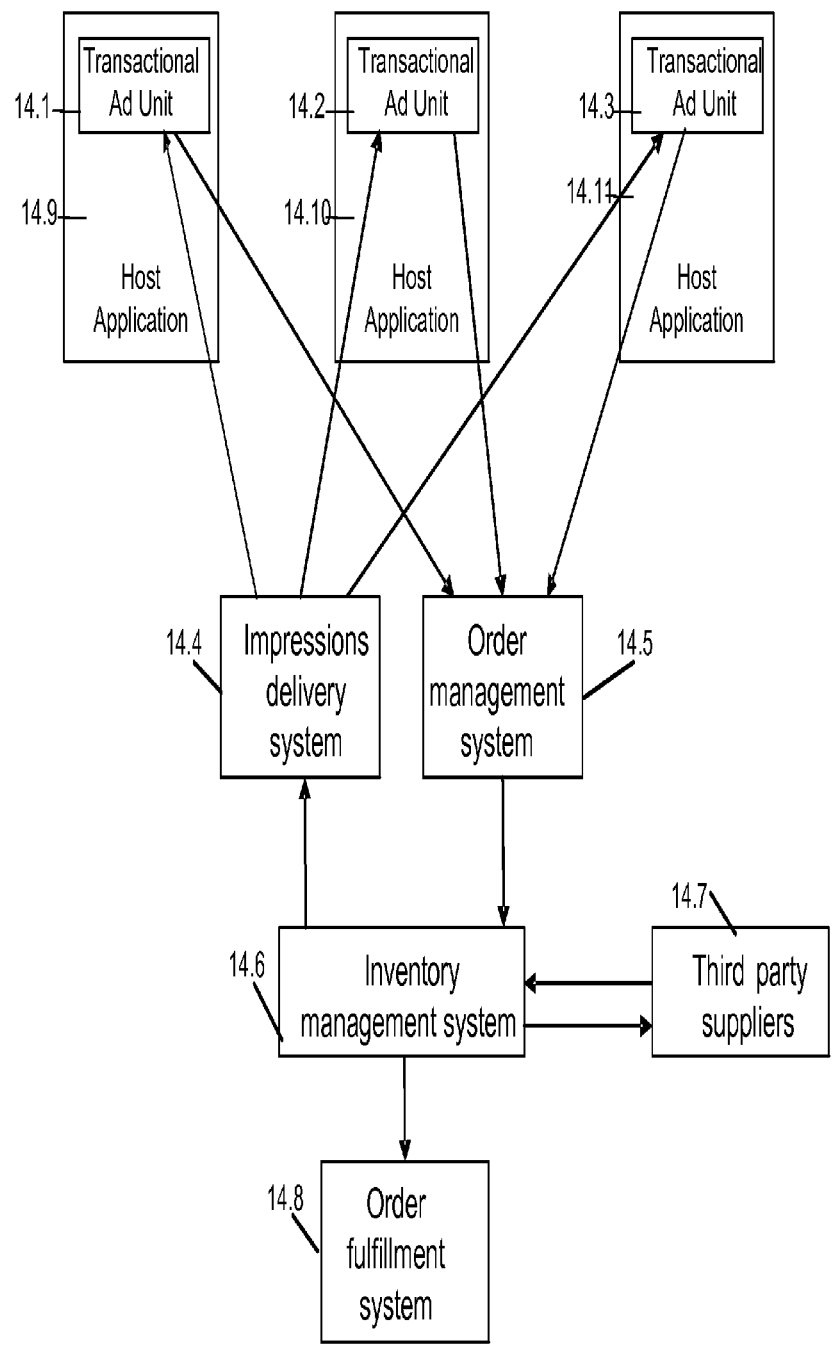
FIG. 14 illustrates an example architecture of the embedded storefront and its supporting infrastructure according to an embodiment of the invention.

FIG. 14 illustrates an example architecture of the embedded storefront 1400 and its supporting infrastructure according to an embodiment of the invention. The embedded storefront architecture 1400 includes a plurality of host applications, such as host applications 1405, 1410, and 1415. Each host application includes one or more transactional ad units embedded therein, such as transactional ad units 14.1, 14.2, and 14.3. The number of host applications and transactional ad units shown in FIG. 14 is intended for the purpose of illustration and implementations of the embedded storefront may include any arbitrary number of host applications and any arbitrary number of transactional ad units embedded therein. For example, there may be millions of transactional ad units embedded in homogeneous or heterogeneous host applications.

Regardless of the number of transactional ad units and host applications, each of the transactional ad units provides product information tailored to the context, including its host application and/or the user of the host application. In an embodiment, an impressions delivery system (14.4) provides product information to transactional ad units for display by their respective host applications.

In an embodiment, the embedded storefront system may be interfaced with inventory management, transaction, processing, and/or order fulfillment systems. In this embodiment, the impressions delivery system may receive information about the products, services, or other entities available for purchase from the inventory management system (14.6). When a customer completes a transaction on a transactional ad unit, the order is received by an order management system (14.5). The order management system processes the order and captures the payment. It may also send the information to the inventory management system to reflect the change in inventory and/or, if the order is for a physical good, send the order to an order fulfillment system, (14.8) or the third party suppliers (14.7). In a embodiment, third party suppliers provide inventory and price information to the retailer In some implementations, the functions of the various entities in the embedded storefront may by combined. For example, a supplier providing goods for sale may also be a retailer that operates the retail system and distributes transactional ad units. In another example, the host application may be produced by the retailer that provides transactional ad units.

I. User Interface

Figure 1A:
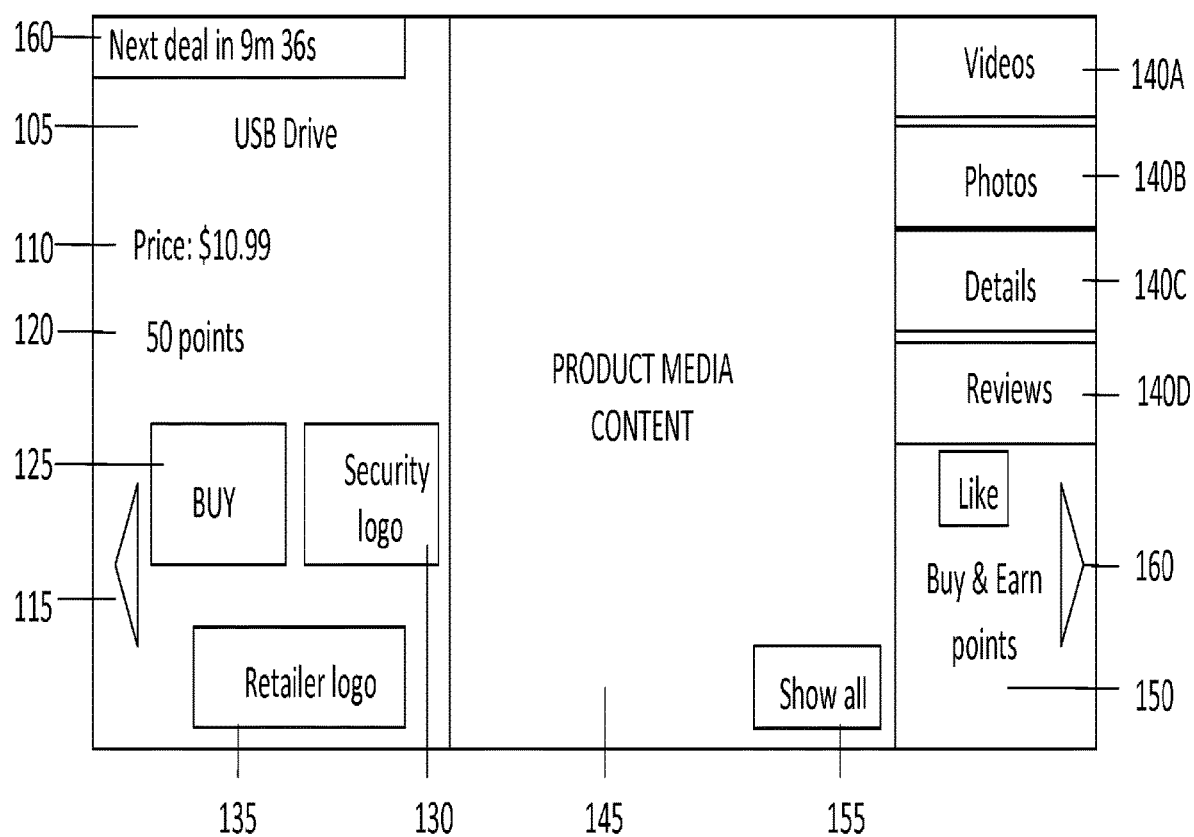
FIGS. 1A-1B illustrate example transactional ad unit interfaces according to embodiments of the invention.

FIG. 1A illustrates an example transactional ad unit interface 100 according to an embodiment of the invention. This example user interface 100 is presented to users within a host application. In this embodiment, details for only one product are visible to the user. The name of this product is indicated by 105. The price that the user will pay is indicated by 110. The price can be described in units of real currency or virtual currency or a combination of both. The virtual currency points that the user will earn by completing the transaction in indicated by 115. In other embodiments, the virtual currency in 110 will be replaced by virtual goods or other rewards such as bid or donations to charity. The user can initiate the purchase by clicking on the button 125. The logo of the security provider verifying the Secure Sockets Layer (SSL) connection is indicated by 130. The name and logo of the application providing the embedded storefront (the retailer) is marked by 135.

Items 140A-140D indicate buttons that when pressed display product media, such as video or animation, text, audio, music, or any other type of interactive or non-interactive electronic content describing the product in the region marked by 145. Product media can include descriptions, specifications, and reviews of the product presented by the transactional ad unit. The position and description of these buttons may differ in other embodiments.

In this example embodiments a video or other product media describing the product is displayed by default in the region marked by 145. When the host application is loaded, the video begins to play without sound. When the user clicks on the video, sound is enabled. If desired, the user can replay the video on completion. In this embodiment, text marked by 150 lets the user know he or she can earn virtual points by making a transaction.

Figure 1B:
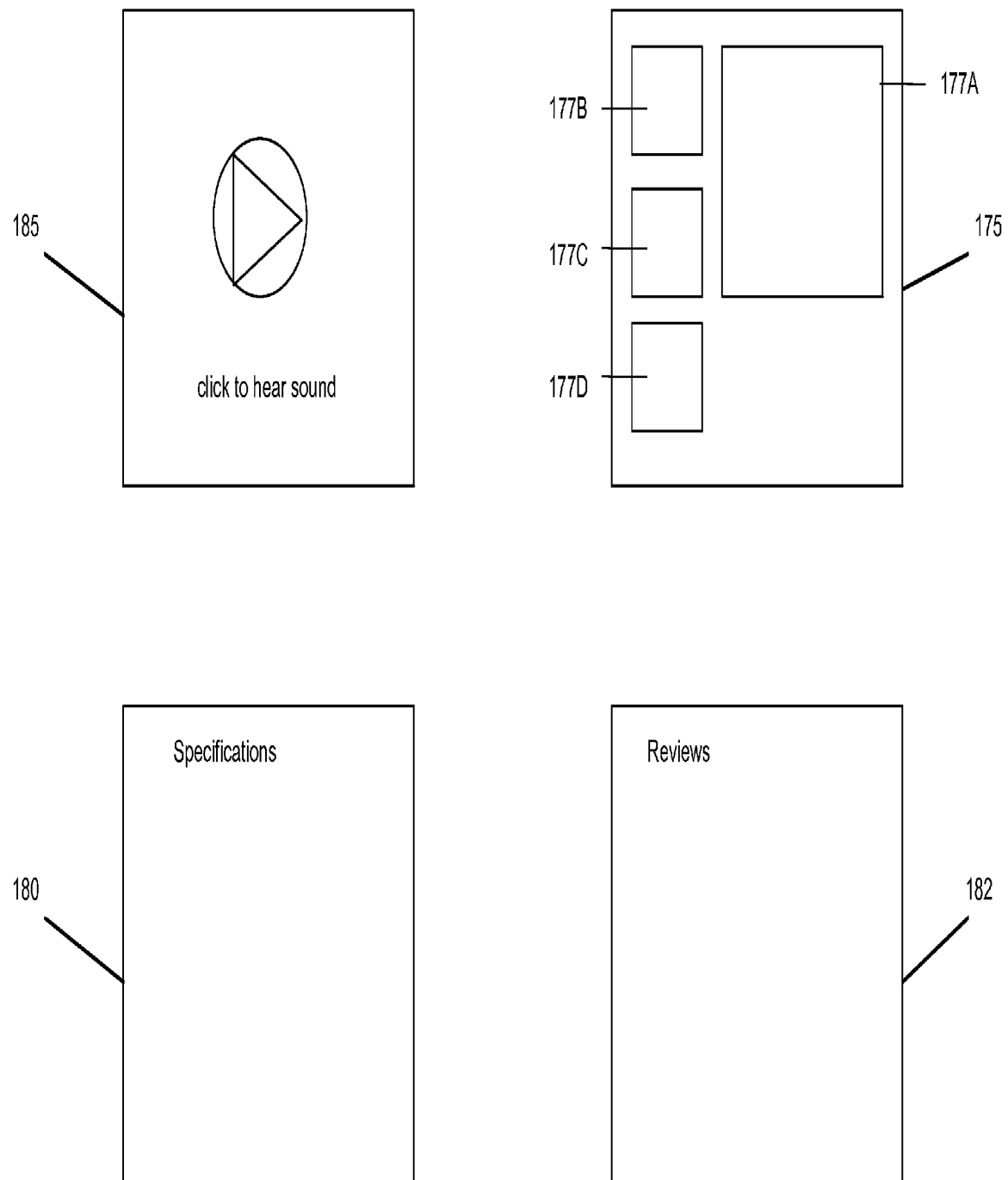

In a further embodiment, owners of the host application, referred to as 'Publishers', can specify the appearance or other attributes of the user interface of transactional ad unit. FIG. 1B illustrates parts of the user interfaces for transactional ad units suitable for user with embodiments of the invention. In one embodiment, a publisher may specify the appearance of the user interface of the transactional ad unit by selecting one or more of a set of predefined user interfaces. In another embodiment, a publisher may specify the appearance of the user interface of the transactional ad unit directly.

In yet another embodiment, the user interface could include characters or characteristics from the host application in order to improve engagement with the transactional ad unit as a whole. In a further embodiment, the publisher might provide context in terms of the user's progress in a game on the host application to the retailer which will enable the retailer to provide context sensitive rewards.

Example 185 illustrates one embodiment of the user interface including video shown when the user clicks on the button 140A. Example 175 illustrates an embodiment of the user interface including the product media displayed in the region marked by 145 when the user clicks on the button 140B. This user interface includes a set of thumbnail images (177B-177D) and a larger picture (177A). On clicking the thumbnails, the larger picture is replaced by the thumbnail that was clicked on. Examples 180 and 182 represent example embodiments of user interfaces displayed when the user clicks on buttons 140C and 140D.

Figure 2:
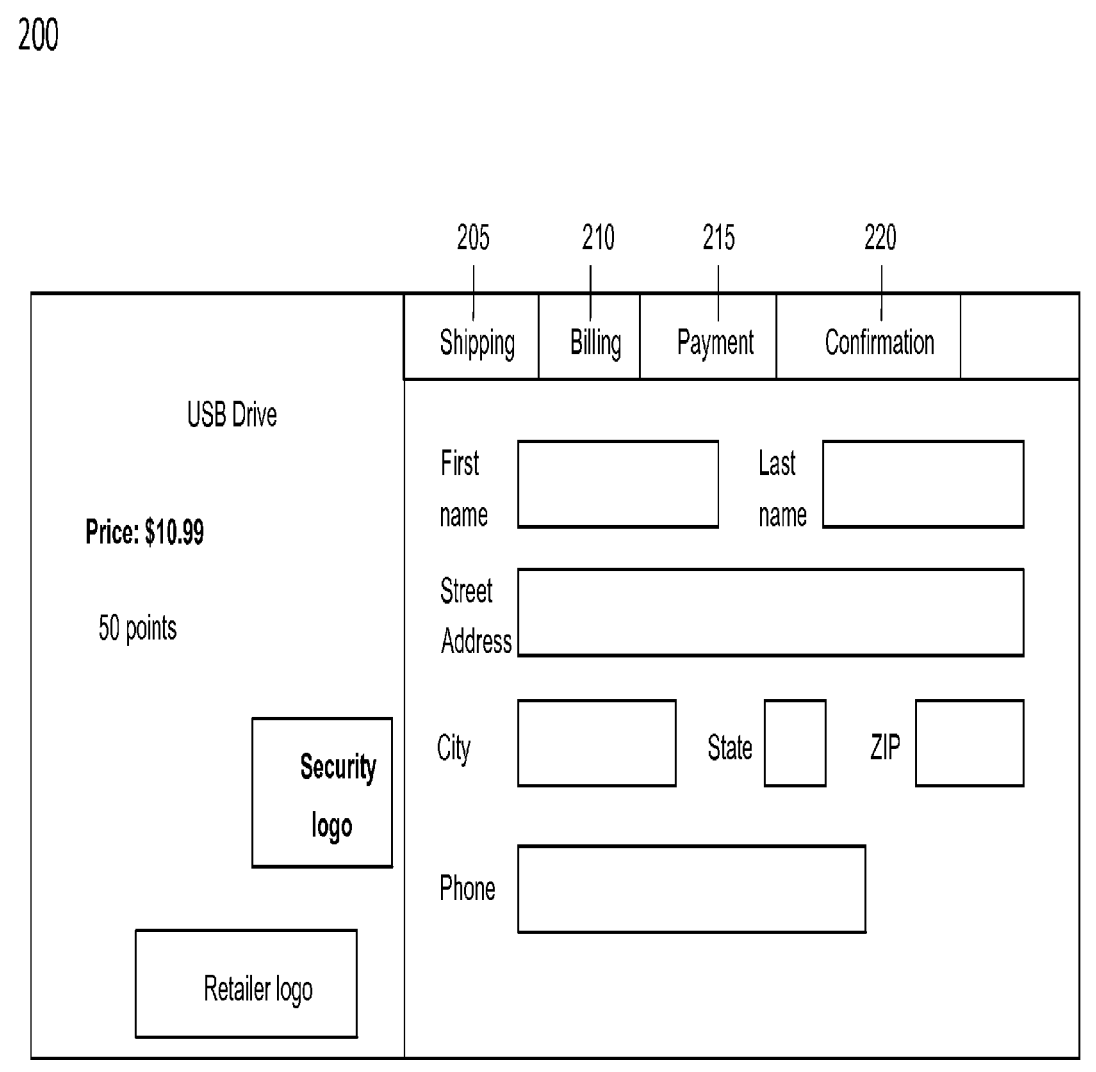

FIG. 2 illustrates an example user interface 200 for purchasing items using the transactional ad unit according to an embodiment of invention. In an embodiment, this user interface 200 is presented to users after a user clicks on the buy button indicated by 125. Completing this form enables the user to make a purchase without leaving the host application. In this embodiment, there are four parts to the user interface 200:

205. Shipping address: This section will contain fields corresponding to the user's shipping address, his or her phone number and email address

210. Billing address: This section will contain fields corresponding to the billing address associated with the chosen payment method.

215. Payment: This section will allow the user to pay using a credit card or via other payment methods such as online payment services. In case of the former, this section will prompt the user to enter a credit card number, the expiration date for the card and the verification code.

220 Confirmation: This section will display a confirmation message when the order has been completed successfully. In another embodiment, the customer can complete the transaction by making the payment through an online payment service on another site.

In the above example embodiments, the user can view one product at a time within the transactional ad unit. In different embodiments, the product that the user is viewing can change in a number of ways, including, for example:

i. The product being displayed changes after finite time intervals where the duration of display can be chosen by either the retailer or the owner of the host application as shown by time display 165 in FIG. 1A.

Buttons with the labels 'Previous product' (115) and 'Next product' (160), as shown in FIG. 1, are included in the transactional ad unit user interface. When the user clicks on either of these buttons, the product being displayed changes.

i. A button with the label 'Show all deals' (155) is included in the transactional ad unit user interface. When the user clicks on this button, the contents of the transactional ad unit user interface are replaced with a display of multiple items available for purchase, such as the example content shown in FIG. 3.

Figure 3:
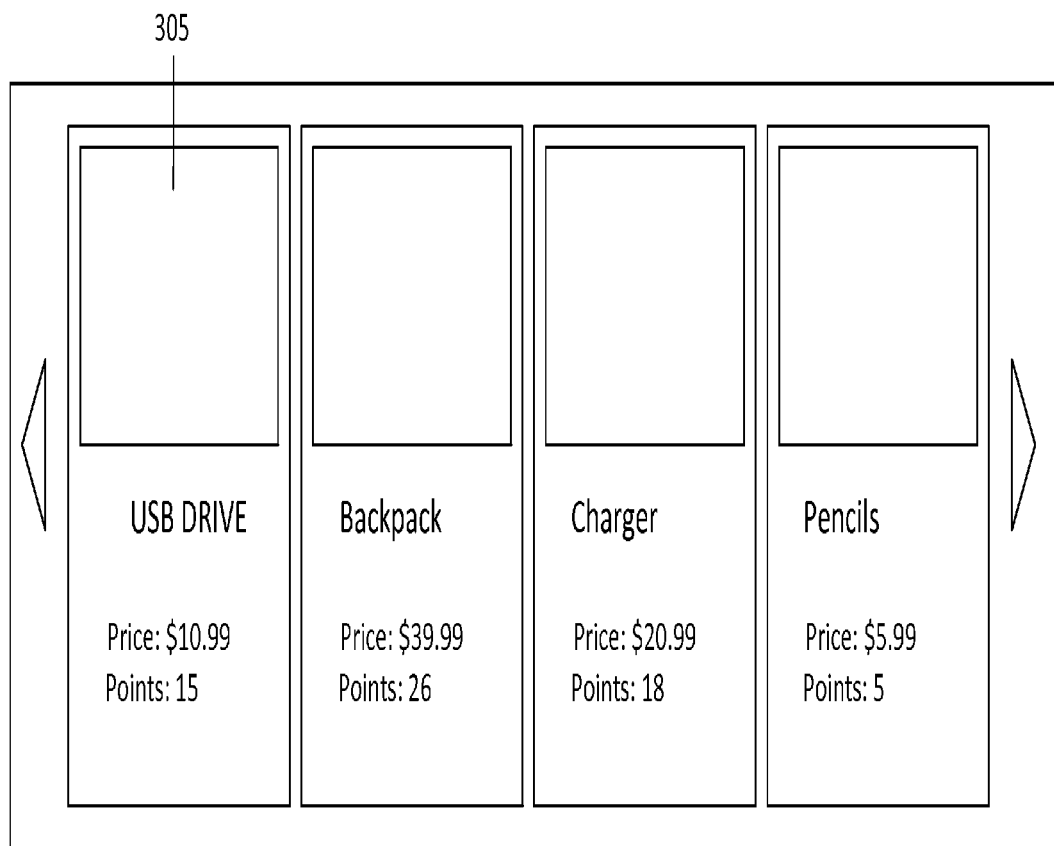
FIG. 3 illustrates another example user interface suitable for use with embodiments of the invention.

FIG. 3 illustrates another example user interface 300 suitable for use with embodiments of the invention. The example user interface 300 of FIG. 3 includes the display of multiple products, services, or other entities available for purchase. Similar to FIGS. 1A and 1B, the display of each product, service, or other entity in the user interface of FIG. 3 includes information such as the product name, the price and the virtual currency points earned on purchase of the item. Each unit, such as unit 305, can be clicked. On clicking, the user will see the selected product in the format shown in FIG. 1A.

II. Ad Serving Technology

Figure 4:
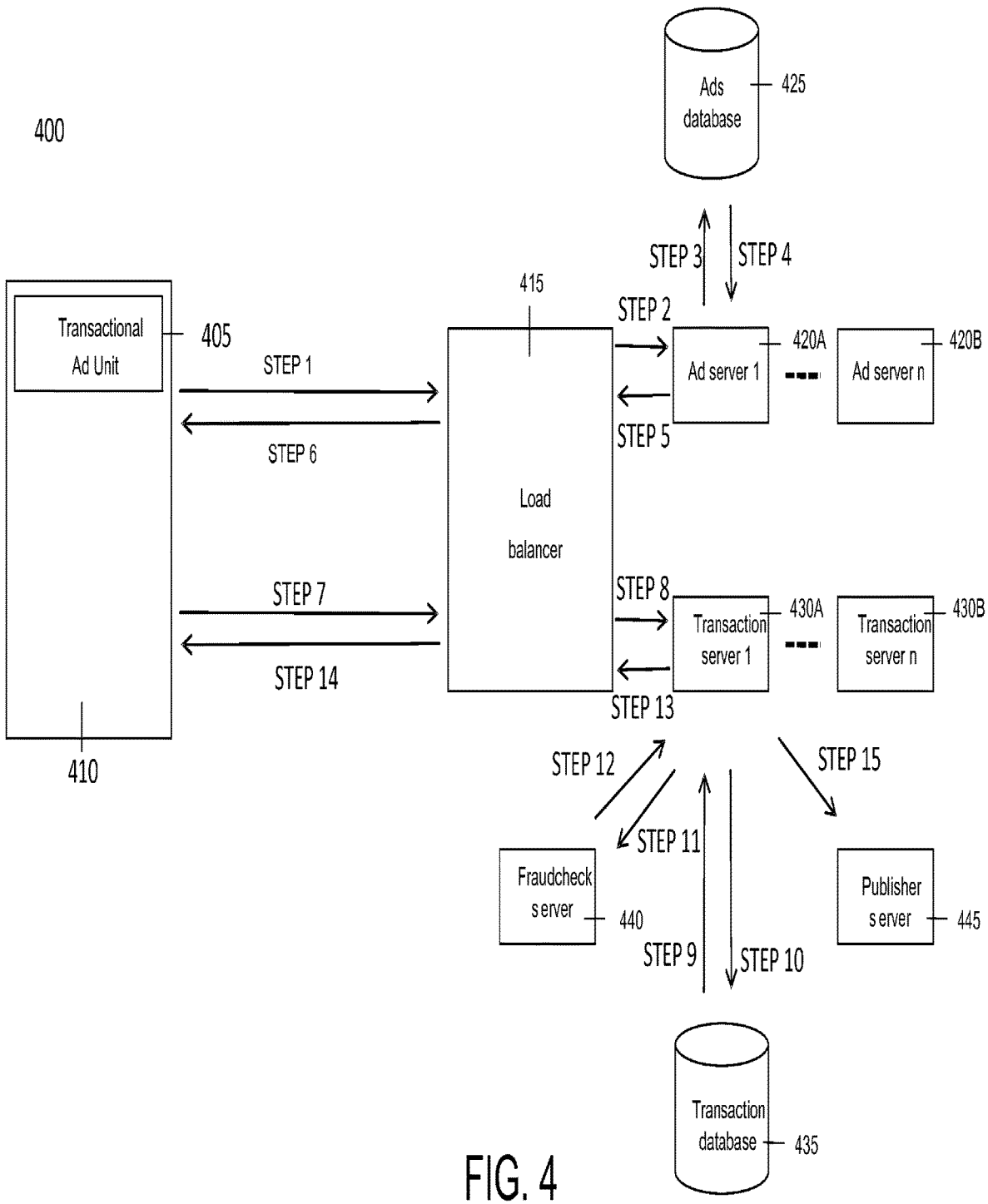
FIG. 4 illustrates an example transactional ad unit distribution architecture according to an embodiment of the invention.

FIG. 4 illustrates an example transactional ad unit distribution architecture 400 according to an embodiment of the invention. In one embodiment, the flow of information within the system is as follows:

Step 1: The transactional ad unit (405) within the browser (410) or other host application issues an ad request which is received by a load balancer (415) operated by the retailer. The load balancer 415 includes one or more computers that distribute incoming requests across multiple ad servers (420A-420B).

Step 2: The load balancer passes the request on an available ad server (420A-420B in this embodiment).

Step 3: The ad server 420 reads the request, does the yield management (described in Section V below) and sends a request for a specific product to the advertisement database (425).

Step 4: The ad server fetches content for the ad unit 405 from the advertisement database 425.

Step 5: The ad server 420 transfers the content to the load balancer 415.

Step 6: The load balancer 415 attaches an impression signature (Section V) to the content and serves it to the host application.

Step 7: The user views and optionally places an order for the product. In one embodiment, the information provided by the user will include shipping address, billing address and payment information such as credit card details. In addition, product details along with the impression signature will be sent to the load balancer 415 from the browser 410. In another embodiment, shipping, billing, and/or payment information may be provided via an online wallet or identity system.

Step 8: The load balancer 415 relays the request to one of a plurality of transaction servers (430A-430B).

Step 9: The transaction server 430 writes the details of the transaction to the transaction database (435)

Step 10: The transaction server 430 fetches an order id from the transaction database 435. Step 11: The transaction server 430 sends order details to the fraud server (440).

Step 12: The fraud server 440 sends fraud score for the order to the transaction server 430. Step 13: The transaction server 430 send order status and order id to the load balancer 415.

Step 14: The load balancer 415 relays the order status and order id to the transactional ad unit 405 contained in the user's browser 410.

Step 15: The transaction server 430 sends the order status and order id with a transaction number to the host application server or publisher server 445. The application server 445 then assigns the advertised number of virtual points to the user's game account.

III. Publisher Interface

Figure 5:
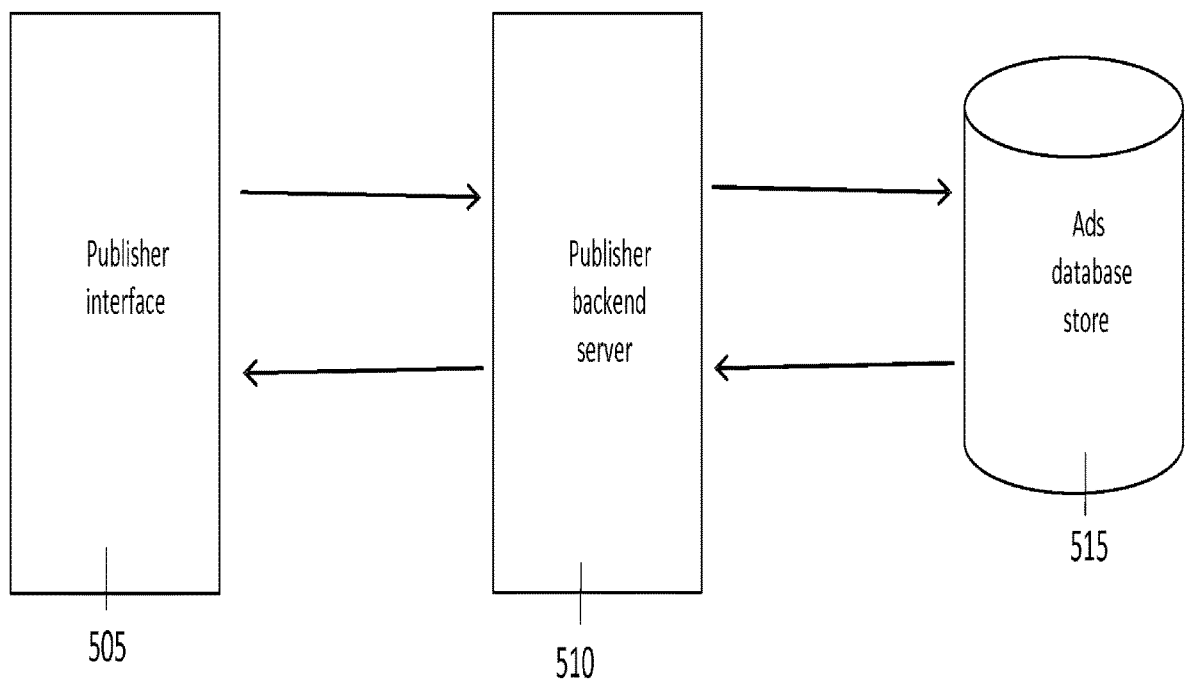
FIG. 5 illustrates an embodiment of a backend architecture.

FIG. 5 illustrates an embodiment of a backend architecture 500 that enables publishers, which provide web sites and other host applications, to control certain aspects of the transactional ad unit that are presented to their users. In this embodiment, each publisher has a login id and a password that enables it to access the publisher interface (505). In one embodiment, the publisher interface enables publishers to configure aspects such as the color, size, type of products shown and frequency of transactional ad unit rotation. The publisher can also specify a minimum threshold for products in terms of a minimum number of transactions for a specified number of impressions.

In this embodiment, the publishers' preferences for transactional ad units are received by the publisher backend server 510 and applied to product specific content stored in the advertisement database (515). In a further embodiment, the publisher interface will also provide the publisher with one or more HTML/JavaScript code snippet, hyperlink, widget, applet, or other container or representation of interactive content that it can insert into their web pages or other host applications. The HTML/JavaScript code snippet will fetch and load the transactional ad unit within the page or host application as part of its presentation of information to users.

IV. Security

Figure 6:
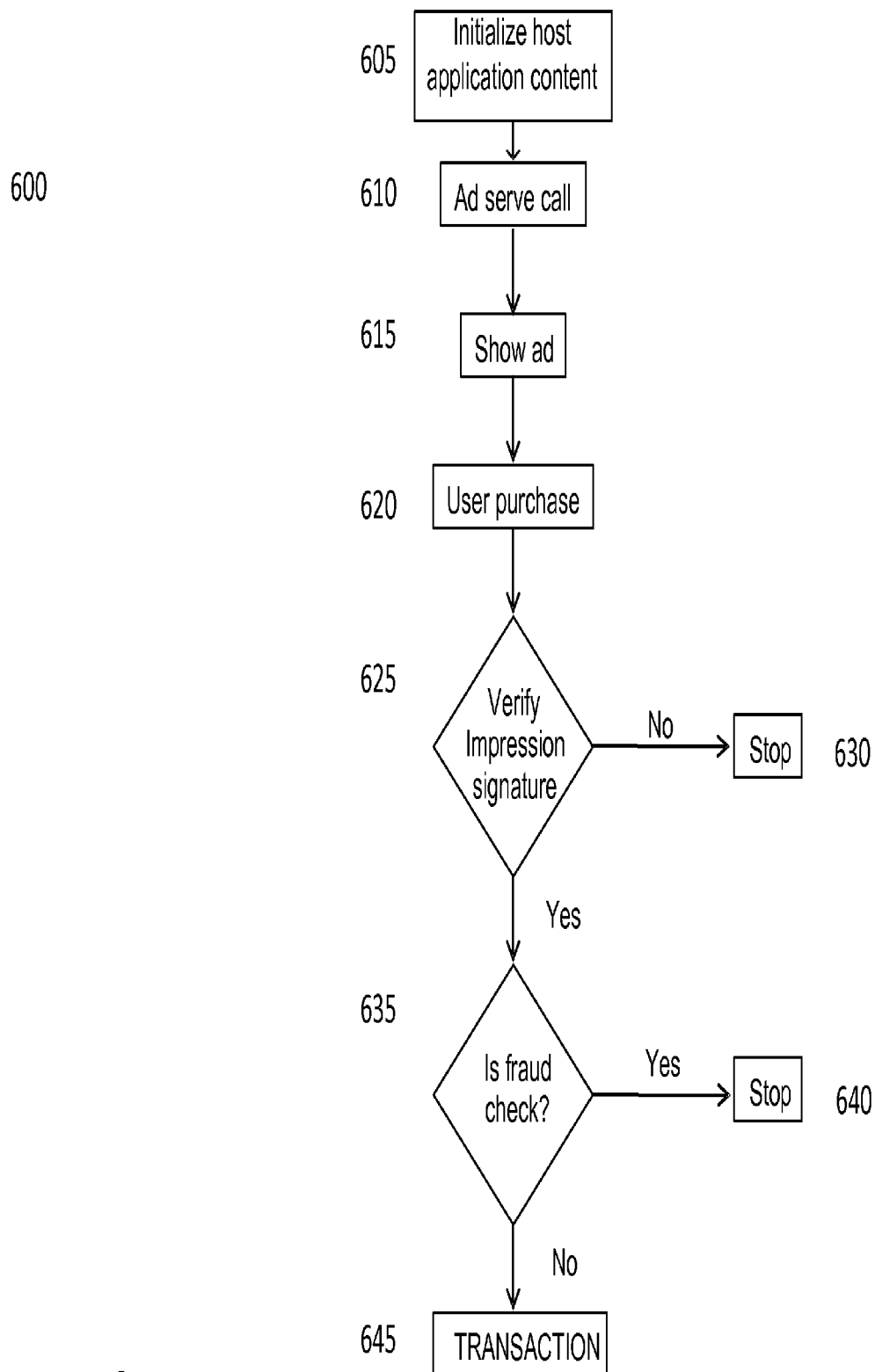
FIG. 6 illustrates an example method for preventing repeat transaction fraud according to an embodiment of the invention.

FIG. 6 illustrates an example method 600 for preventing repeat transaction fraud according to an embodiment of the invention. The browser loads the web page or the host application content is initialized (605). As the host application content is initialized for presentation to users, the host application contacts the ad server (610) and sends it a publisher id. The ad server generates a digital signature for each impression or contact from a host application. An impression includes the content for the transactional ad unit that is relevant to one product.

In one embodiment, the digital signature is a md5 hash of the publisher id, the time stamp, the publisher secret key and the retailer secret key. The ad server returns content for the ad unit along with a signature (a 'signed impression'). In addition, the ad server also returns the time stamp corresponding to the time that the impression was server. The impression is shown in the host application in 615 The user views the impression and makes a purchase within the transactional ad unit in 620. The impression associated with the transaction is verified in 625. The verification is done in three steps: First, the signature is reconstructed from the time stamp and the publisher id. Second, the reconstructed signature is compared with the signature received with the transaction. Third, the time stamp is verified to be within a fixed interval from the impression time stamp. In one embodiment the time interval is set at twenty minutes. If the transaction does pass the verification in 625, a fraud check (635) is initiated else the transaction is not processed 630.

In an embodiment, the transaction is put through a series of fraud tests in 635. In one embodiment, a test could be the distance between the billing and shipping address. The test score indicates the risk factor associated with failing the test. The overall fraud score is obtained by combining the individual test scores. On completion of the fraud check, the order is placed in one of three categories—high, medium and low risk. High risk orders are cancelled 640. Medium risk orders are put through a second round of manual verification 640 while low risk orders are processed 645.

V. Yield Management

Figure 7:
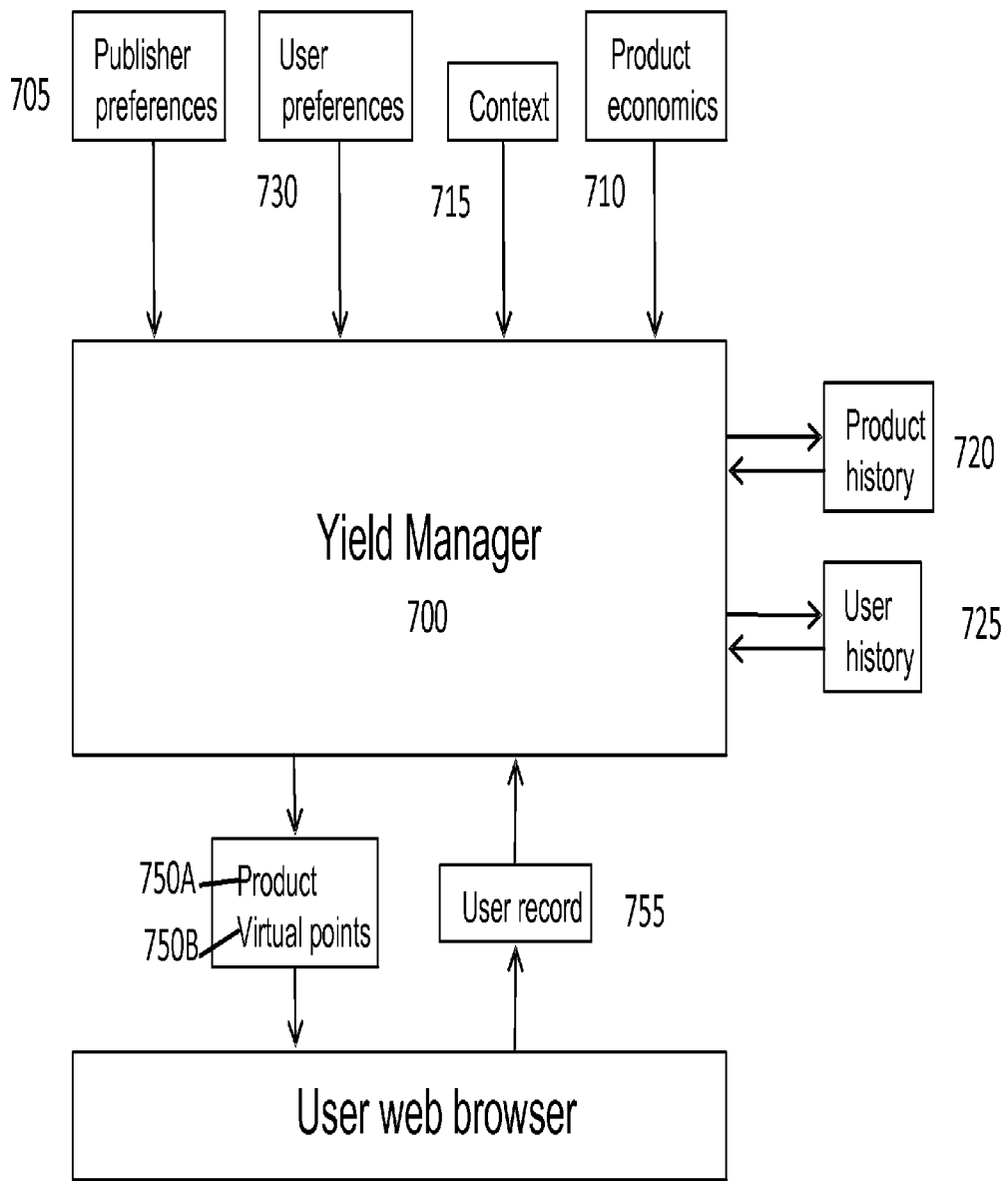
FIG. 7 illustrates an architecture for a yield manager according to an embodiment of the invention.

FIG. 7 illustrates an architecture for a yield manager 700 according to an embodiment of the invention. Given a transactional ad unit request, an embodiment of the yield manager 700 selects the content of a transactional ad unit to be presented to a user, including one or more products, services, or other entities available for purchase 750A and the amount of virtual currency points, virtual goods, or other awards 750B to be rewarded to the user on completion of a transaction. In this embodiment, the yield manager 700 combines the following inputs:

i. Publisher Preferences 705: In one embodiment, publishers can select the order in which categories of products appear within the transactional ad unit on the host application. The yield manager will use this order as one input in generating a product.

ii. Product Economics 710: In one embodiment, the amount of virtual currency earned on completion of a transaction will vary by product pricing and product demand. For example, purchases of more expensive products will generally reward users with more virtual currency than purchases of less expensive products. Similarly, purchases of less popular products will generally reward users with more virtual currency than purchases of more popular products. In some embodiments, the amount of virtual currency points, virtual goods, and/or other awards associated with a product may be varied dynamically based on current demand for the product.

iii. Transactional Ad Unit Context 715: In one embodiment, the transactional ad unit will analyze the content of the webpage or game on which it appears and use the signal as one of the parameters in choosing the right product.

iv. Product History 720: In one embodiment, the yield manager will keep track of product sales and user interaction history by host application and accordingly serve products that are the best fit for the host application.

v. User History 725: In one embodiment, the yield manager will keep track of product sales and user interaction history 755 by user and derive a signal to serve personalized product recommendations.

vi. User preferences 730: In one embodiment, there will be a button on the transactional ad unit marked 'Customize'. On hitting the button, a popup dialog box will prompt the user to enter categories and products of interest. This information by the yield manager to serve products that are of higher relevance to the user.

Figure 8:
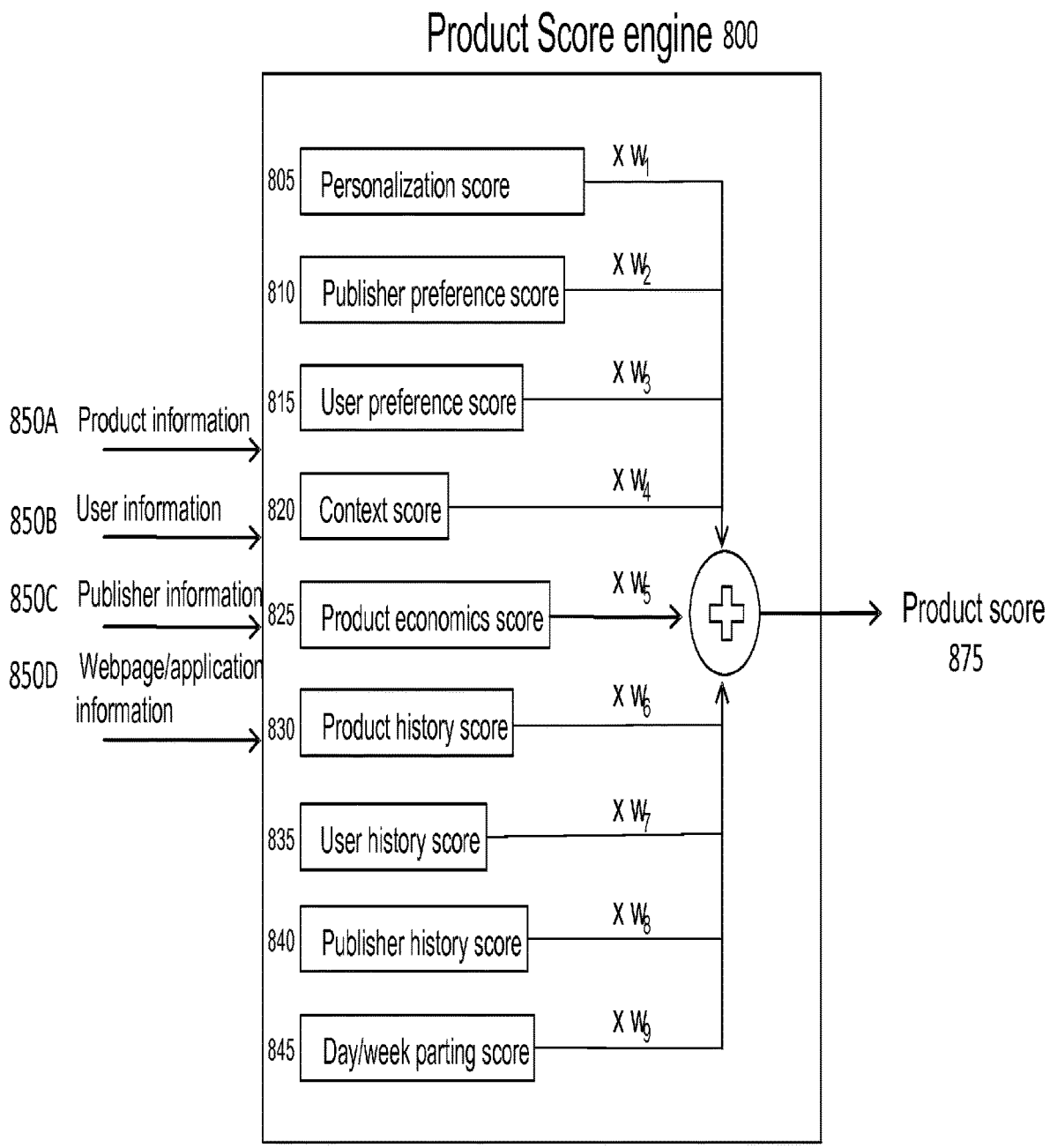
FIG. 8 illustrates an example product score engine according to an embodiment of the invention.
Figure 9:
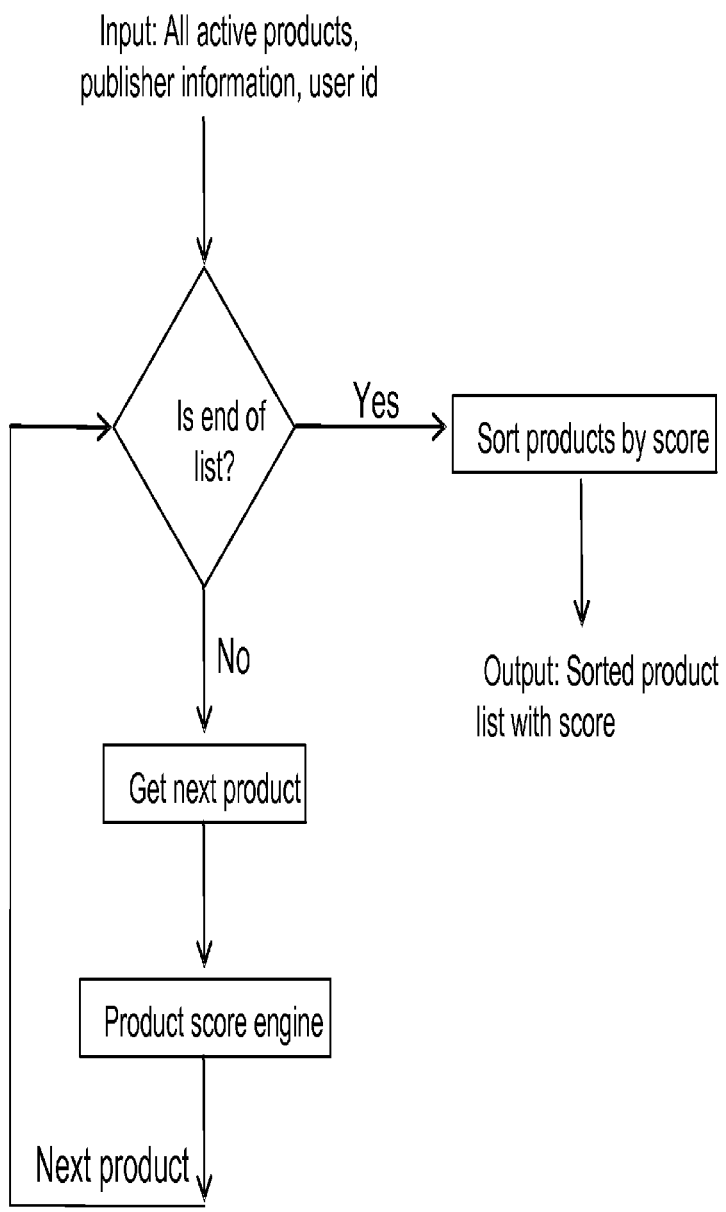
FIG. 9 illustrates a method for generating a list of products sorted by score according to an embodiment of the invention.

In an embodiment, the yield manager 700 includes a product score engine that assigns product score values to products, services, and other entities available for purchase. The yield manager 700 selects products with the best product score values for presentation to the user via the transactional ad unit. FIG. 8 illustrates an example product score engine 800 according to an embodiment of the invention. In this embodiment, the product score engine 800 accepts inputs including: the set of all active products 850A, information about the publisher 850C, information 850D about the current web page and/or application, and any information 850B about the user or customer viewing the transactional ad unit. For each active product in the list, the product score engine 800 is used to compute a product score 875. Once all the products are scored, the list is sorted by the score. FIG. 9 illustrates a method 900 for generating a list of products sorted by score according to an embodiment of the invention. The sorted list is used to determine the products and the order in which to present a set of products to the user. In one embodiment, the sorted list is generated at the start of an user session and the products in the list are displayed in order at finite time intervals. In another embodiment, the sorted list is generated with each user interaction.

Embodiments of the yield manager select products for presentation to users based in part on information collected from users. In a further embodiment, the host application can limit or control data collection from its users by modifying settings in the publisher dashboard. In yet a further embodiment, users can control what information is collected by modifying settings in the user preferences panel.

As described above, dynamic pricing may be used to assign virtual currency points, virtual goods, or other awards with items available for purchase. In one embodiment, virtual currency points and other awards are assigned to products on the basis factors including:
 a. The retailer's selling price for the product
 b. The sales velocity (sales volumes over a finite period of time) of the product
 c. The negotiated terms with the publisher.
 d. The amount of time left for the product listing to expire.

In another embodiment, the points assigned to a particular product dynamically changes with a change in one of the quantities (a)-(d).

In an embodiment, the product score engine 800 determines product score values from a weighted sum of two or more factors, including example factors such as a personalization score 805, a publisher preference score 810, a user preference score 815, a context score 820, a product economics score 825, a product history score 830, a user history score 835, a publisher history score 840, and a day/week parting score 845. The weights assigned to these factors may be assigned by heuristics or using statistical techniques, such as linear regression.

805. Personalization Score

In one embodiment, the interactions between users and products as well as relationships between users and relationships between products are stored in a bipartite graph of products and users. In this bipartite graph, the nodes are defined by product ids and user ids while the edges are weighted by the relationships between the nodes. In one embodiment, The personalization score for a specific product is obtained by performing a double node query on the bipartite graph using the user id and the product id of the product as inputs.

Figure 10:
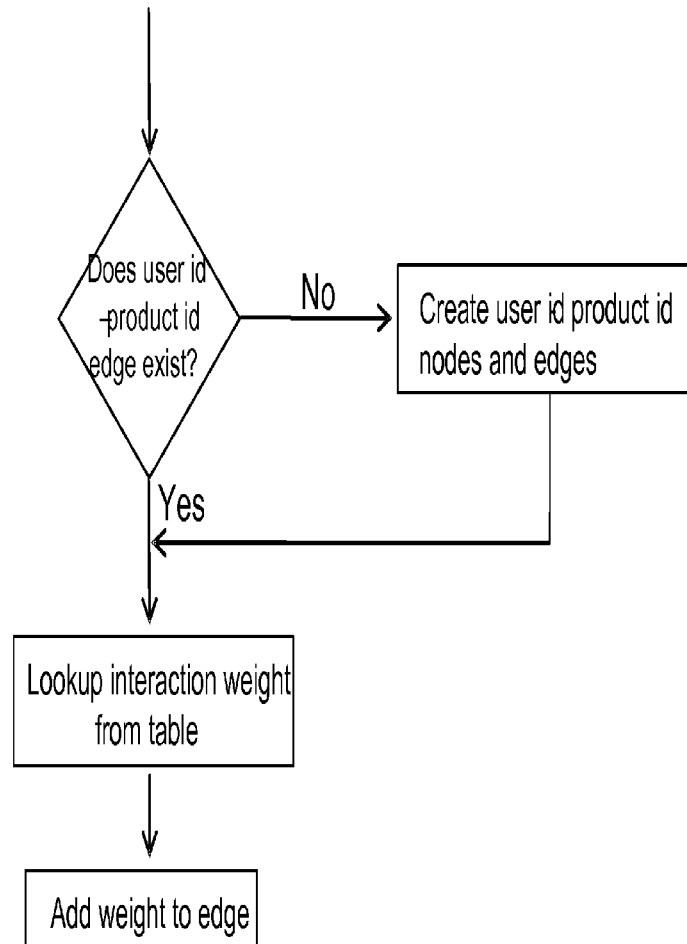
FIG. 10 illustrates an example method of performing an update operation according to an embodiment of the invention.

In this embodiment, the operations on the graph include:
a. The update operation: In this operation, the interaction between a user and a product or the relationship between two users is stored as the weight of an edge connecting the two nodes in the bipartite graph. In one embodiment, the weight associated with any interaction or relationship is stored in a lookup table. In another embodiment, the weight is dynamically tuned using feedback loops where a particular edge between two nodes is reinforced as more paths are created between the nodes in question or weights of existing paths between the two nodes are increased. FIG. 10 illustrates an example method 1000 of performing an update operation according to an embodiment of the invention.

b. The single node query: In this operation, the graph is queried using a single node (a user id in this embodiment) and a specified distance n. In response, the graph returns a list of products that are at most n edges away from the specified node along with the sum of path weights for all paths between the product and the specified node for each product. Here, the path weight of a path is defined as the sum of weights of the edges belonging to that path.

Figure 11:
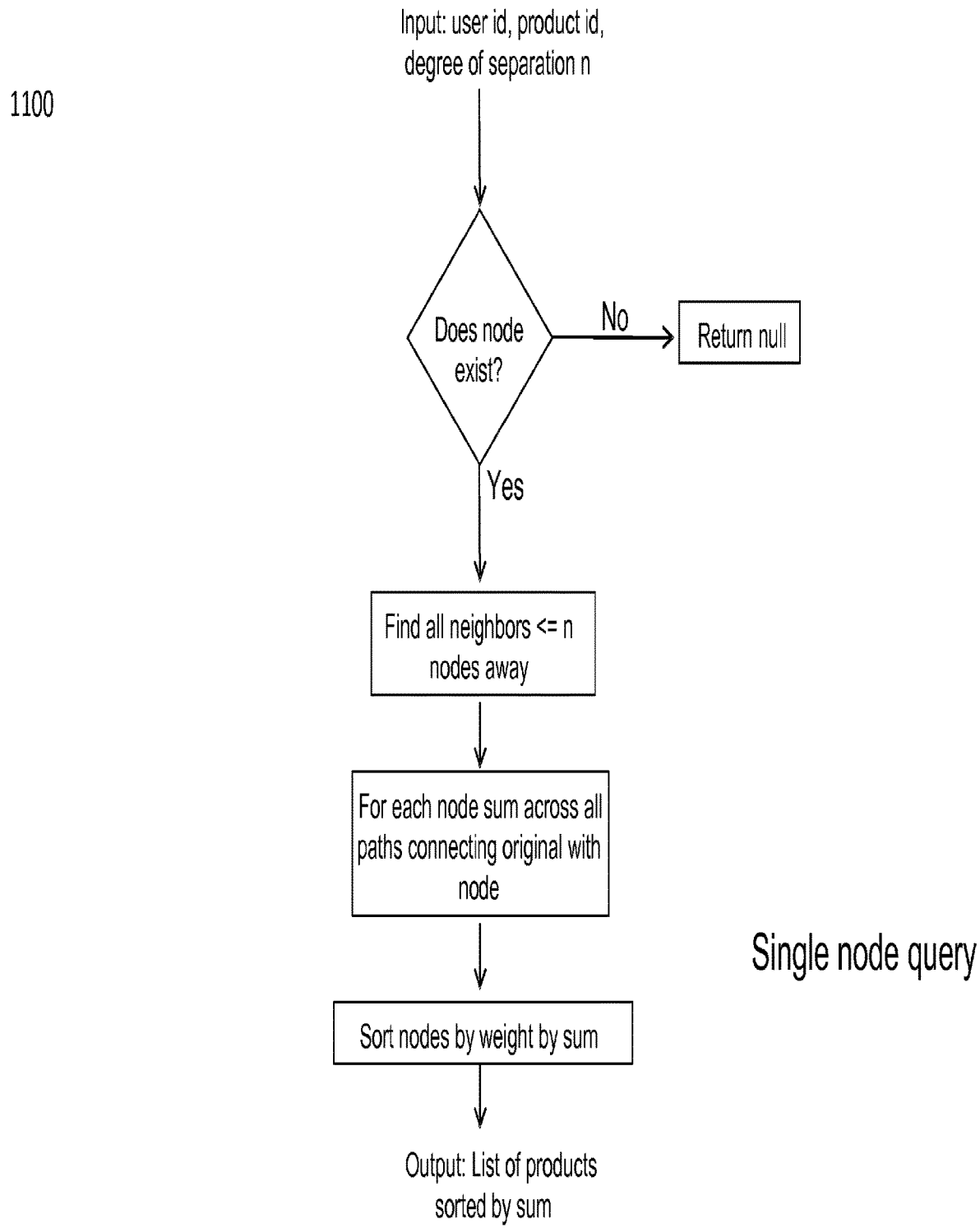
FIG. 11 illustrates an example method of performing a single node query according to an embodiment of the invention.
Figure 12:
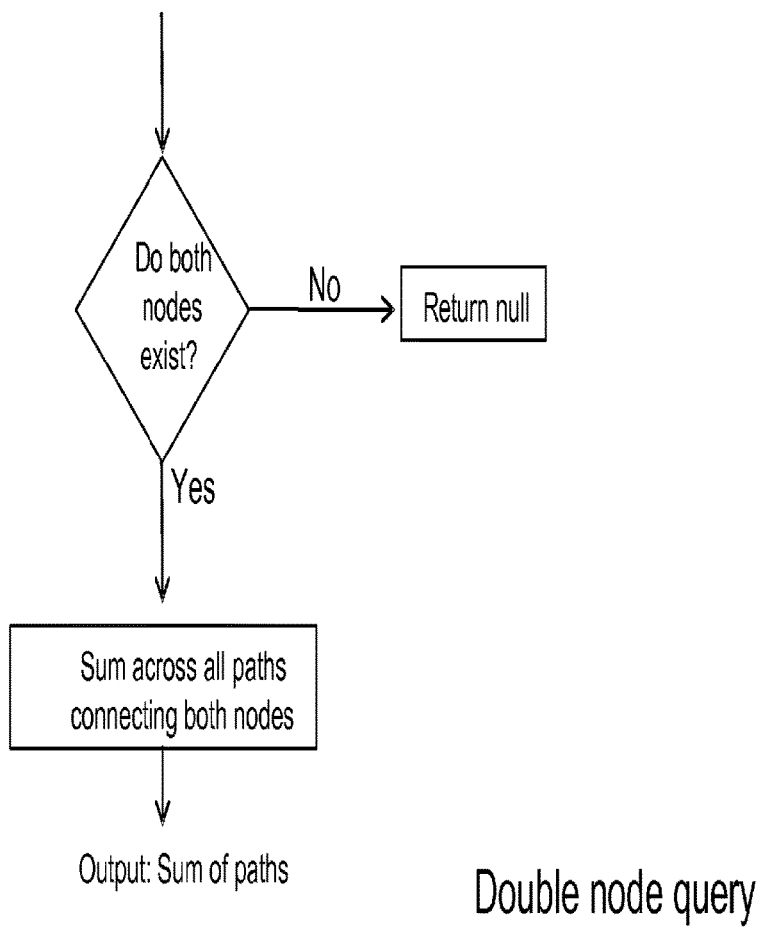
FIG. 12 illustrates a method of performing a double node query according to an embodiment of the invention.

FIG. 11 illustrates an example method 1100 of performing a single node query according to an embodiment of the invention.

c. The double node query: In the operation, the graph is queried using two nodes as input. In response the graph returns the sum of path weights for all paths between the specified nodes. FIG. 12 illustrates a method 1200 of performing a double node query according to an embodiment of the invention.

810. Publisher Preference Score

In an embodiment, using the publisher dashboard, the publisher will be able to specify:

a. The categories of products that should be shown b. The demography using the application/website/game c. A blacklist of products that should not be shown In an embodiment, the publisher preference score may include a sum based on the three above factors. First, any product that falls into one of the categories specified in (a) listed above will be given a particular score. Second, in one embodiment, the retailer may tag every product with demographic tags such as the gender, age group and location of people that the particular product might appeal to. In this embodiment, the yield manager will compare these tags with those specified by the publisher in (b) and will assign a score for each tag that is matched. Third, any product that appears on the blacklist specified by the published in (c) above will receive a negative score.

815. User Preference Score

In an embodiment, users will be able to specify their preference in terms of verticals, categories, products and other tags (such as 'urban', 'hipster' etc) that they are interested in. They will be able to do this by clicking on a personalize button placed on the transactional ad unit panel (FIG. 1). In an embodiment, each product is also tagged with one or multiple categories and verticals. In addition, attributes that describe the product are tagged to it. In an embodiment, the user preference score is based on the number and identity of product tags that overlap with user preference tags.

820. Context Score

In an embodiment, a request for a transactional ad unit triggers a callback that scans the publisher webpage or application for text content. The text content is parsed and analyzed to produce a list of products that are referred to or might be of interest to users viewing that particular webpage or application. In an embodiment, the text content is analyzed by breaking the text content into a set of tokens or short phrases. Each token is then matched against a list of products and their tags. Matches are associated with score values. The scores are then summed up product and sorted to produce the list of products along with a score called the 'Context score'.

825. Product Economics Score

In an embodiment, a product economics score is based on factors including the combination of three scores. The first score is based on the discount, i.e. the difference between Manufacturer's Suggested Retail Price (MSRP) and retailer's sale price for a particular product. The second score is based on the gross margin, i.e. the difference between the retailer's sale price and the retailer's cost price for a particular item. The third score is based on the sales volumes within a certain time period for a particular product.

830. Product History Score

In an embodiment, each product has a product history score that is a sum of two quantities. The first is proportional to the ratio of the number of times an user interacts with the transactional ad unit when that particular product was displayed to the number of times the same product was displayed in the transactional ad unit. The second is proportional to the ratio of the number of times that particular product was purchased to the number of times the product was displayed in the transactional ad unit. In another embodiment, a quantity proportional to the average amount of time spent by the user interacting with the transactional ad unit when the particular product was displayed is also added to the product history score.

835. User History Score

In an embodiment, the user interaction with a product displayed in the transactional ad unit is analyzed to generate a user history score. User interactions with the product that are logged include impressions, content interactions, video replays, picture views, purchases, and social networking features such as likes and recommendations. Each interaction is associated with a score and included in the user history score.

In a further embodiment, the user history score is then applied to the category and vertical that the product belongs to. When a request is made from a transactional ad unit for a product, the user history scores for a particular user across multiple verticals and categories are compared. Products inherit the user history scores for the vertical or category that they belong in. These scores are used by the Yield manager when coming up with the final product score.

840. Publisher History Score

In an embodiment, the publisher history score is generated by averaging the user history scores described above across some or all users seeing the transactional ad unit on a particular website or application. In a further embodiment, the publisher history score is measured for each website or application across multiple categories and verticals. Like for the user history score, products may inherit the publisher history score for a particular category or vertical.

845. Day Parting and Week Parting Scores

In an embodiment, the day parting and week parting scores are obtained by measuring the sales volume for the particular product during different hours of the day and different days of the week respectively. The scores are proportional to the average sales volume during the hour and day corresponding to the time of the request.

VI. Retailer Marketplace

In one embodiment, third party retailers, suppliers or distributors ('Third party merchants') will be able to offer products to be sold through a network of transactional ad units. In this embodiment, third party merchants will upload product descriptions through a separate merchant dashboard. Product descriptions will include product videos, images, other product content, a description, price and the time window during which the product is to be offered. In one embodiment, the third party merchant can also specify the amount of virtual currency that the customer will earn on completing a transaction.

In an embodiment, the third party supplier will be able to control the distribution of ads and associated points through the merchant dashboard. In one embodiment, suppliers will be able to indicate what host applications their products might appear on. In some embodiments, the products offered by third party suppliers are displayed along with products offered directly by the retailer within the same transactional unit. The yield manager is used to target the products at user segments. In some embodiments, products offered by third party suppliers may be marked to indicate their origin with the third-party, rather than the retailer.

In a further embodiment, users can annotate products that appeal or do not appeal to them. Users can also to rate the third party supplier based on their experience with the supplier. In some embodiments, these ratings of third party products and third party suppliers will be taken into account to decide priority order of different third party suppliers while displaying products to users. This information, as collected or aggregated, may also be provided to the third party supplier to help with better product selection.

In one embodiment, the transaction will be completed by the retailer. In addition, the ping back to the publisher server for points on completion of a transaction will be issued by the retailer. In this embodiment, the funds captured will be transferred to the third party supplier at pre-agreed intervals. The fulfillment for the transaction will be made by the third party supplier.

VII. Playlists

In one embodiment, multiple products will be collated in a list ('playlist') by the retailer, third-party suppliers, and/or customers. Shoppers will be able to browse products by traversing the playlist. In this embodiment, shoppers will be able to create a playlist of their own, add favorite products and share the playlist with other shoppers by sending a electronic message via direct messaging, such as e-mail, or via social networking services. In one embodiment, each playlist is tagged with a unique token that allows the creator of the playlist to be identified. In this embodiment, when a purchase is made from a shared playlist by another user, the creator of the original playlist might be rewarded with either virtual points or discounts on other products.

In one embodiment, users will be able to broadcast their purchases directly from the transactional ad unit using direct messaging and/or social networking services. Social networking services may be accessed by the transactional ad unit via one or more application programming interfaces provided by the social networking services. In this embodiment, users generating additional sales will be rewarded additional virtual points or discounts.

In an embodiment, the transactional ad unit is delivered as an advertisement or other presentation within a host application, such as a utility, productivity, or game application, on a mobile electronic device, such as a mobile phone or smart phone, portable media player, mobile internet access device, or tablet computer. In this embodiment, the user views product information and complete the transaction within the transactional ad unit with leaving the host application, (except for providing payment in some cases). In a further embodiment, products, services, and/or other entities available for purchase are selected for presentation to the user based on the location of the user and/or the type of mobile device in addition to some or all of the factors discussed above. In still another embodiment, users will be able to start the transaction within one application and complete it within another.

Embodiments of the transactional ad unit may support a variety of revenue and monetization schemes. In one implementation, the host providing the host application, such as a game application or web page, is not paid to carry the transactional ad unit. However, users of the host application are awarded a certain amount of virtual currency per transaction. The hosts are compensated when these users use the virtual currency to buy virtual goods offered by the hosts. In another implementation, hosts are paid a fixed amount or a certain percentage of the retailer's selling price for each transaction. In yet another implementation, the host might be paid per thousand impressions served. In each of these cases, payments are made by the retailer at certain pre-agreed intervals.

In still a further implementation, third-parties using the transactional ad units to sell their products and services may pay the retailer or other entity providing the transactional ad unit system. In an embodiment, this payment may either be in the form of a margin based commission, revenue based commission or a pre-agreed fixed amount for a specified number of impressions for a particular product.

Figure 13:
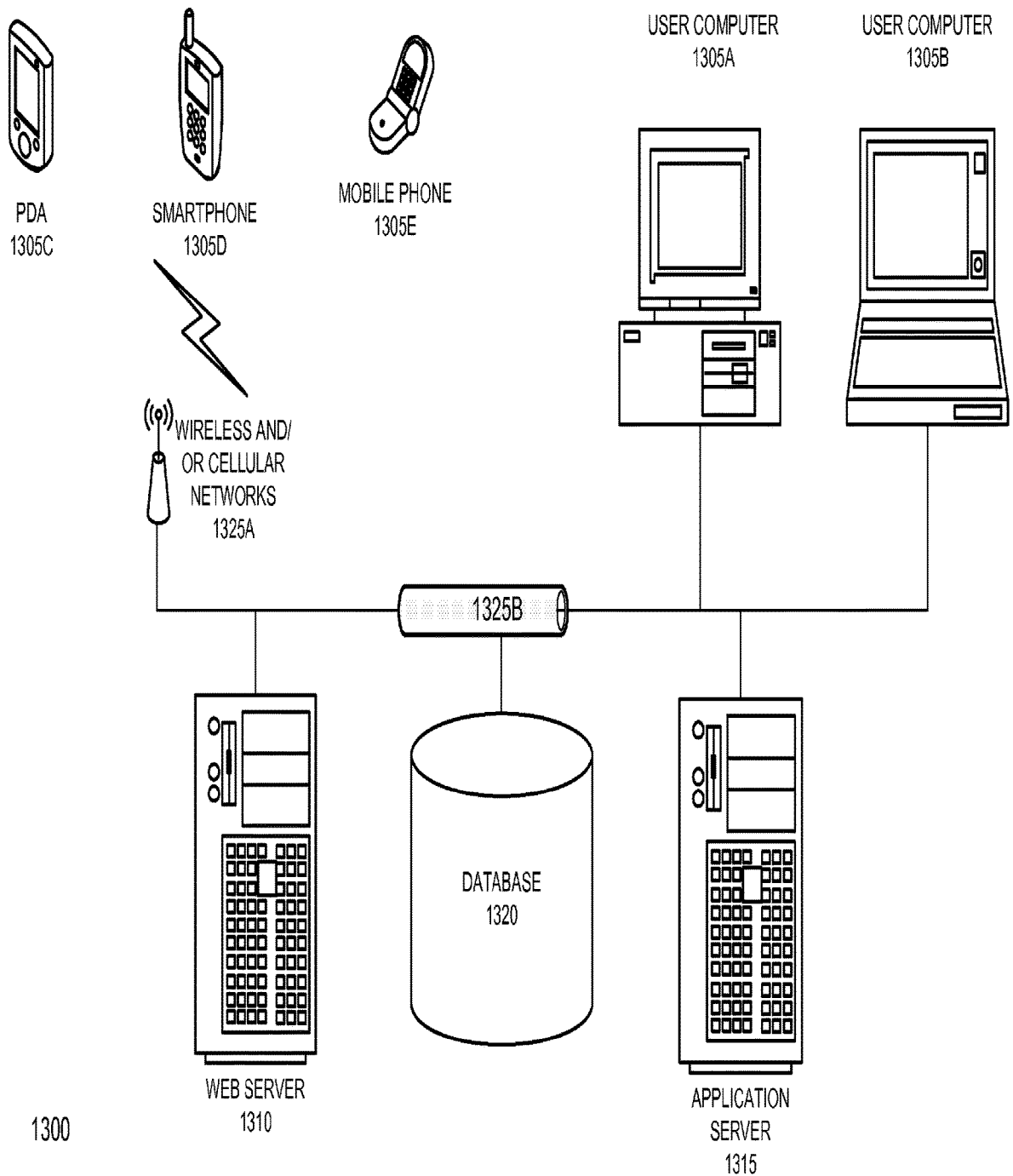
FIG. 13 illustrates an example system architecture suitable for implementing an embodiment of the invention.

FIG. 13 illustrates an example system architecture 1300 suitable for implementing an embodiment of the invention. The system includes user computers 1305 including portable 1305a and desktop personal computers 1305b, personal digital assistants 1305c, smartphones 1305d, and mobile phones 1305e. The system can interface with any type of electronic device, such as a thin-client computer, Internet-enabled mobile telephone, mobile Internet access device, electronic book, or personal digital assistant, capable of displaying and navigating web pages or other types of electronic documents. Although system is shown with five user computers, any number of user computers can be supported.

A web server 1310 is used to process requests from web browsers and standalone applications for web pages, electronic documents, social media networking service content, and other data from the user computers. The web server 1310 may also provide syndicated content, such as RSS or Atom feeds, of data related to service requests, service providers, bids, and consumer feedback.

Application server 1315 operates one or more data applications. The data applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails or .NET.

The data applications on application server 1315 process input data and user computer requests and can store or retrieve data from database 1320. Database 1320 stores data created and used by the data applications. In an embodiment, the database 1320 is a relational database, such as MySQL, that is adapted to store, update, and retrieve data in response to SQL format commands.

In an embodiment, the application server 1315 is one or more general purpose computers capable of executing programs or scripts. In an embodiment, the web server 1310 is implemented as an application running on one or more general purpose computers. The web server and application server may be combined and executed on the same computers.

An electronic communication network 1325 enables communication between user computers 1305, web server 1310, application server 1315, and database 1320. In an embodiment, network 1325 may further include any form of electrical or optical communication devices, including wireless 1325a and wired 1325b networks. Network 1325 may also incorporate one or more local-area networks, such as an Ethernet network; wide-area networks, such as the Internet and cellular carrier data networks; and virtual networks, such as a virtual private network.

The system is one example for executing data applications according to an embodiment of the invention. In another embodiment, application server, web server, and optionally database can be combined into a single server computer application and system. In alternate embodiment, all or a portion of the web server and application functions may be integrated into an application running on each of the user computers. For example, a JavaScript application on the user computer may be used to retrieve or analyze data and display portions of the applications.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A computer program product comprising at least one non-transitory computer-readable storage medium having computer-executable program code portions stored therein, the computer-executable program code portions comprising program code instructions configured to:
   cause host content to be displayed in a host application;
   determine additional content based at least in part on user-specific information and on configuration aspects set by a publisher of the host application; and
   cause the additional content to be displayed in the host application proximate the host content;
   enable access, from a user device utilizing the host application, via a click of a button, to information associated with the additional content without leaving the host application, wherein the information associated with the additional content comprises at least one of video information, image information, specifications information, or reviews information; and
   upon a detection of the access via the click of the button, to the information associated with the additional content, cause display of information associated with the additional content without modifying the display of the host content in the host application.

2. The computer program product of claim 1, wherein the computer-executable program code portions further comprise program code instructions configured to:
   cause the additional content to be displayed in the host application proximate host content enabling a user utilizing the host application to purchase a product or service associated with the additional content without leaving the host application.

3. The computer program product of claim 2, wherein the computer-executable program code portions further comprise program code instructions configured to:
   collect user transaction information via a transactional ad unit interface.

4. The computer program product of claim 1, wherein the additional content includes a description of at least one product including a good or service.

5. The computer program product of claim 1, wherein the additional content includes a description of at least one product including a virtual good or a virtual currency.

6. The computer program product of claim 1, wherein the host application includes a web browser.

7. The computer program product of claim 6, wherein accessing the additional content from the host content is via a hyperlink included the host content.

8. An apparatus comprising at least one processor and at least one memory including computer program code, the at least one memory and the computer program code configured to, with the processor, cause the apparatus to at least:
   cause host content to be displayed in a host application;
   determine additional content based at least in part on user-specific information and on configuration aspects set by a publisher of the host application; and
   cause the additional content to be displayed in the host application proximate the host content;
   enable access, from a user device utilizing the host application, via a click of a button, to information associated with the additional content without leaving the host application, wherein the information associated with the additional content comprises at least one of video information, image information, specifications information, or reviews information; and
   upon a detection of the access via the click of the button, to the information associated with the additional content cause display of information associated with the additional content without modifying the display of the host content in the host application.

9. The apparatus of claim 8, wherein the at least one memory and the computer program code are further configured to, with the processor, cause the apparatus to:
   cause the additional content to be displayed in the host application proximate host content enabling a user utilizing the host application to purchase a product or service associated with the additional content without leaving the host application.

10. The apparatus of claim 9, wherein the at least one memory and the computer program code are further configured to, with the processor, cause the apparatus to:
    collect user transaction information via a transactional ad unit interface.

11. The apparatus of claim 8, wherein the additional content includes a description of at least one product including a good or service.

12. The apparatus of claim 8, wherein the additional content includes a description of at least one product including a virtual good or a virtual currency.

13. The apparatus of claim 8, wherein the host application includes a web browser.

14. The apparatus of claim 13, wherein accessing the additional content from the host content is via a hyperlink included the host content.

15. A method comprising:
    causing, via a processor, host content to be displayed in a host application;
    determining via the processor, additional content based at least in part on user-specific information and on configuration aspects set by a publisher of the host application; and
    causing the additional content to be displayed in the host application proximate the host content;
    enabling access, from a user device utilizing the host application, via a click of a button, to information associated with the additional content without leaving the host application, wherein the information associated with the additional content comprises at least one of video information, image information, specifications information, or reviews information; and
    upon a detection of the access via the click of the button, to the information associated with the additional content, causing display of information associated with the additional content without modifying the display of the host content in the host application.

16. The method of claim 15, further comprising:
    causing the additional content to be displayed in the host application proximate host content enabling a user utilizing the host application to purchase a product or service associated with the additional content without leaving the host application.

17. The method of claim 16, further comprising:
collecting user transaction information via a transactional ad unit interface.

18. The method of claim 15, wherein the additional content includes a description of at least one product including a good or service.

19. The method of claim 15, wherein the additional content includes a description of at least one product including a virtual good or a virtual currency.

20. The method of claim 15, wherein the host application includes a web browser.

21. The method of claim 20, wherein accessing the additional content from the host content is via a hyperlink included the host content.

* * * * *

UNITED STATES PATENT AND TRADEMARK OFFICE
CERTIFICATE OF CORRECTION

| | | |
|---|---|---|
| PATENT NO. | : 12,020,278 B2 | Page 1 of 1 |
| APPLICATION NO. | : 17/646003 | |
| DATED | : June 25, 2024 | |
| INVENTOR(S) | : Rajiv Bhat et al. | |

It is certified that error appears in the above-identified patent and that said Letters Patent is hereby corrected as shown below:

On the Title Page

In Column 1, item (71), Applicant, Line 1, delete "Groupon, Inc., Chicago, IL (US)" and insert -- ByteDance Inc., Wilmington, DE (US) --, therefor.

Signed and Sealed this
Twenty-sixth Day of November, 2024

Katherine Kelly Vidal
*Director of the United States Patent and Trademark Office*